United States Patent
Leitch et al.

(10) Patent No.: US 9,686,205 B2
(45) Date of Patent: Jun. 20, 2017

(54) METHOD FOR PROVIDING A CONNECTION OF A CLIENT TO AN UNMANAGED SERVICE IN A CLIENT-SERVER REMOTE ACCESS SYSTEM

(71) Applicant: Calgary Scientific Inc., Calgary (CA)

(72) Inventors: Sam Anthony Leitch, Sammamish, WA (US); Matthew James Stephure, Calgary (CA); Kevin Glen Robinson, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 319 days.

(21) Appl. No.: 14/534,274

(22) Filed: Nov. 6, 2014

(65) Prior Publication Data
US 2015/0156133 A1 Jun. 4, 2015

Related U.S. Application Data

(60) Provisional application No. 61/910,189, filed on Nov. 29, 2013, provisional application No. 61/944,720, filed on Feb. 26, 2014.

(51) Int. Cl.
*H04L 12/911* (2013.01)
*G06F 15/16* (2006.01)
(Continued)

(52) U.S. Cl.
CPC ............ *H04L 47/70* (2013.01); *H04L 67/145* (2013.01); *H04L 67/16* (2013.01); *H04L 69/28* (2013.01)

(58) Field of Classification Search
USPC ............... 709/219, 203, 223, 224, 217, 225
See application file for complete search history.

(56) References Cited

U.S. PATENT DOCUMENTS 4,975,690 A 12/1990 Torres
5,345,550 A 9/1994 Bloomfield
(Continued)

FOREIGN PATENT DOCUMENTS

CN 102821413 12/2012
EP 0349463 1/1990
(Continued)

OTHER PUBLICATIONS

Search Report and Written Opinion, dated Nov. 16, 2015, received in connection with SG Application No. 2013087150.
(Continued)

*Primary Examiner* — Jude Jean Gilles
(74) *Attorney, Agent, or Firm* — Meunier Carlin & Curfman LLC

(57) ABSTRACT

Systems and methods for providing a connection of a client to an unmanaged service in a client-server remote access system. An unmanaged service may register at a remote access server and open a communication connection there between remote access server may be configured for providing remote access to the unmanaged service by a client. The remote access server receives keep-alive messages from the unmanaged service over the communication connection, which may serve to indicate that the unmanaged service is operational. The remote access server may a request for a client connection to the unmanaged service, after which, a terminate keep-alive message is communicated to the unmanaged service to terminate the sending of keep-alive messages from the unmanaged service in response to the request for the client connection to the unmanaged service.

20 Claims, 5 Drawing Sheets

(51) Int. Cl.
*H04L 29/08* (2006.01)
*H04L 29/06* (2006.01)

(56) References Cited

U.S. PATENT DOCUMENTS

| | | |
|---|---|---|
| 5,555,003 A | 9/1996 | Montgomery et al. |
| 5,742,778 A | 4/1998 | Hao et al. |
| 5,844,553 A | 12/1998 | Hao et al. |
| 5,870,759 A | 2/1999 | Bauer et al. |
| 5,920,311 A | 7/1999 | Anthias |
| 5,978,842 A | 11/1999 | Noble et al. |
| 6,045,048 A | 4/2000 | Wilz et al. |
| 6,061,689 A | 5/2000 | Chang et al. |
| 6,075,531 A | 6/2000 | DeStefano |
| 6,141,698 A | 10/2000 | Krishnan et al. |
| 6,145,098 A | 11/2000 | Nouri et al. |
| 6,253,228 B1 | 6/2001 | Ferris et al. |
| 6,343,313 B1 | 1/2002 | Salesky et al. |
| 6,453,334 B1 | 9/2002 | Vinson et al. |
| 6,453,356 B1 | 9/2002 | Sheard et al. |
| 6,570,563 B1 | 5/2003 | Honda |
| 6,601,233 B1 | 7/2003 | Underwood |
| 6,792,607 B1 | 9/2004 | Burd et al. |
| 6,918,113 B2 | 7/2005 | Patel et al. |
| 6,938,096 B1 | 8/2005 | Greschler et al. |
| 6,970,459 B1* | 11/2005 | Meier .......... H04L 12/4641 370/389 |
| 6,976,077 B1 | 12/2005 | Lehew et al. |
| 7,065,568 B2 | 6/2006 | Bracewell et al. |
| 7,069,227 B1 | 6/2006 | Lintel, III et al. |
| 7,073,059 B2 | 7/2006 | Worely et al. |
| 7,149,761 B2 | 12/2006 | Cooke et al. |
| 7,167,893 B1 | 1/2007 | Malone et al. |
| 7,174,504 B2 | 2/2007 | Tsao |
| 7,181,686 B1 | 2/2007 | Bahrs |
| 7,193,985 B1* | 3/2007 | Lewis .......... H04W 48/17 370/338 |
| 7,240,162 B2 | 7/2007 | de Vries |
| 7,246,063 B2 | 7/2007 | James et al. |
| 7,320,131 B1 | 1/2008 | O'Toole, Jr. |
| 7,343,310 B1 | 3/2008 | Stender |
| 7,350,151 B1 | 3/2008 | Nakajima |
| 7,418,711 B1 | 8/2008 | Lee et al. |
| 7,451,196 B1 | 11/2008 | de Vries et al. |
| 7,577,751 B2 | 8/2009 | Vinson et al. |
| 7,620,901 B2 | 11/2009 | Carpenter et al. |
| 7,647,370 B1 | 1/2010 | Liu et al. |
| 7,650,444 B2 | 1/2010 | Dirstine et al. |
| 7,656,799 B2 | 2/2010 | Samuels et al. |
| 7,706,399 B2 | 4/2010 | Janczak |
| 7,725,331 B2 | 5/2010 | Schurenberg et al. |
| 7,802,183 B1 | 9/2010 | Essin |
| 7,831,919 B1 | 11/2010 | Viljoen et al. |
| 7,921,078 B2 | 4/2011 | McCuller |
| 7,941,488 B2 | 5/2011 | Goodman et al. |
| 7,966,572 B2 | 6/2011 | Matthews et al. |
| 8,024,523 B2 | 9/2011 | de Vries et al. |
| 8,261,345 B2 | 9/2012 | Hitomi et al. |
| 8,356,252 B2 | 1/2013 | Raman et al. |
| 8,359,591 B2 | 1/2013 | de Vries et al. |
| 8,509,230 B2 | 8/2013 | Vinson et al. |
| 8,527,706 B2 | 9/2013 | de Vries et al. |
| 8,572,178 B1 | 10/2013 | Frazzini et al. |
| 8,606,952 B2 | 12/2013 | Pasetto et al. |
| 8,607,158 B2 | 12/2013 | Molander et al. |
| 8,627,081 B2 | 1/2014 | Grimen et al. |
| 8,667,054 B2 | 3/2014 | Tahan |
| 8,832,260 B2 | 9/2014 | Raja et al. |
| 8,924,512 B2 | 12/2014 | Stoyanov et al. |
| 2001/0047393 A1 | 11/2001 | Arner et al. |
| 2002/0032751 A1 | 3/2002 | Bharadwaj |
| 2002/0032804 A1 | 3/2002 | Hunt |
| 2002/0092029 A1 | 7/2002 | Smith |
| 2003/0014735 A1 | 1/2003 | Achlioptas et al. |
| 2003/0023670 A1 | 1/2003 | Walrath |
| 2003/0065738 A1 | 4/2003 | Yang et al. |
| 2003/0120324 A1 | 6/2003 | Osborn et al. |
| 2003/0120762 A1 | 6/2003 | Yepishin et al. |
| 2003/0149941 A1 | 8/2003 | Tsao |
| 2003/0163514 A1 | 8/2003 | Waldschmidt |
| 2003/0184584 A1 | 10/2003 | Vachuska et al. |
| 2003/0208472 A1 | 11/2003 | Pham |
| 2004/0015842 A1 | 1/2004 | Nanivadekar et al. |
| 2004/0029638 A1 | 2/2004 | Hytcheson et al. |
| 2004/0039742 A1 | 2/2004 | Barsness et al. |
| 2004/0068516 A1 | 4/2004 | Lee et al. |
| 2004/0106916 A1 | 6/2004 | Quaid et al. |
| 2004/0117804 A1 | 6/2004 | Scahill et al. |
| 2004/0153525 A1* | 8/2004 | Borella .......... H04L 29/06 709/217 |
| 2004/0162876 A1 | 8/2004 | Kohavi |
| 2004/0183827 A1 | 9/2004 | Putterman et al. |
| 2004/0236633 A1 | 11/2004 | Knauerhase et al. |
| 2004/0243919 A1 | 12/2004 | Muresan et al. |
| 2004/0249885 A1 | 12/2004 | Petropoulakis et al. |
| 2005/0005024 A1 | 1/2005 | Samuels et al. |
| 2005/0010871 A1 | 1/2005 | Ruthfield et al. |
| 2005/0021687 A1 | 1/2005 | Anastassopoulos et al. |
| 2005/0050229 A1 | 3/2005 | Comeau et al. |
| 2005/0138631 A1 | 6/2005 | Bellotti et al. |
| 2005/0188046 A1 | 8/2005 | Hickman et al. |
| 2005/0188313 A1 | 8/2005 | Matthews et al. |
| 2005/0240906 A1 | 10/2005 | Kinderknecht et al. |
| 2006/0004874 A1 | 1/2006 | Hutcheson et al. |
| 2006/0026026 A1 | 2/2006 | Hindle |
| 2006/0031377 A1 | 2/2006 | Ng et al. |
| 2006/0036770 A1 | 2/2006 | Hosn et al. |
| 2006/0101397 A1 | 5/2006 | Mercer et al. |
| 2006/0130069 A1 | 6/2006 | Srinivasan et al. |
| 2006/0231175 A1 | 10/2006 | Vondracek et al. |
| 2006/0236328 A1 | 10/2006 | DeWitt |
| 2006/0258462 A1 | 11/2006 | Cheng et al. |
| 2006/0265689 A1 | 11/2006 | Kuznetsov et al. |
| 2006/0271563 A1 | 11/2006 | Angelo et al. |
| 2006/0288171 A1 | 12/2006 | Tsien |
| 2006/0294418 A1 | 12/2006 | Fuchs |
| 2007/0024645 A1 | 2/2007 | Purcell et al. |
| 2007/0047535 A1 | 3/2007 | Varma |
| 2007/0067754 A1 | 3/2007 | Chen et al. |
| 2007/0079244 A1 | 4/2007 | Brugiolo |
| 2007/0112880 A1 | 5/2007 | Yang et al. |
| 2007/0120763 A1 | 5/2007 | De Paepe et al. |
| 2007/0130292 A1 | 6/2007 | Tzruya et al. |
| 2007/0203944 A1 | 8/2007 | Batra et al. |
| 2007/0208718 A1 | 9/2007 | Javid et al. |
| 2007/0226636 A1 | 9/2007 | Carpenter et al. |
| 2007/0244990 A1 | 10/2007 | Wells |
| 2007/0256073 A1 | 11/2007 | Troung et al. |
| 2007/0282951 A1 | 12/2007 | Selimis et al. |
| 2008/0134211 A1 | 6/2008 | Cui |
| 2008/0146194 A1 | 6/2008 | Yang et al. |
| 2008/0183190 A1 | 7/2008 | Adcox et al. |
| 2008/0313282 A1 | 12/2008 | Warila et al. |
| 2009/0044171 A1 | 2/2009 | Avadhanula |
| 2009/0080523 A1 | 3/2009 | McDowell |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2010/0077058 A1 | 3/2010 | Messer |
| 2010/0131591 A1 | 5/2010 | Thomas et al. |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0268813 A1 | 10/2010 | Pahlavan et al. |
| 2011/0138283 A1 | 6/2011 | Marston |
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0252152 A1 | 10/2011 | Sherry et al. |
| 2012/0030275 A1 | 2/2012 | Boller et al. |

(56) References Cited

U.S. PATENT DOCUMENTS

| | | | |
|---|---|---|---|
| 2012/0084713 | A1 | 4/2012 | Desai et al. |
| 2012/0090004 | A1 | 4/2012 | Jeong |
| 2012/0133675 | A1 | 5/2012 | McDowell |
| 2012/0154633 | A1 | 6/2012 | Rodriguez |
| 2012/0221792 | A1 | 8/2012 | de Vries et al. |
| 2012/0226742 | A1 | 9/2012 | Momchilov et al. |
| 2012/0245918 | A1 | 9/2012 | Overton et al. |
| 2012/0246225 | A1 | 9/2012 | Lemire et al. |
| 2012/0324032 | A1 | 12/2012 | Chan |
| 2013/0007227 | A1 | 1/2013 | Hitomi et al. |
| 2013/0031618 | A1 | 1/2013 | Momchilov |
| 2013/0046815 | A1 | 2/2013 | Thomas et al. |
| 2013/0046816 | A1 | 2/2013 | Thomas et al. |
| 2013/0054679 | A1 | 2/2013 | Jooste |
| 2013/0070740 | A1 | 3/2013 | Yovin |
| 2013/0117474 | A1 | 5/2013 | Ajanovic et al. |
| 2013/0138791 | A1 | 5/2013 | Thomas et al. |
| 2013/0147845 | A1 | 6/2013 | Xie et al. |
| 2013/0159062 | A1 | 6/2013 | Stiehl |
| 2013/0179962 | A1 | 7/2013 | Arai et al. |
| 2013/0262566 | A1 | 10/2013 | Stephure et al. |
| 2013/0290408 | A1 | 10/2013 | Stephure et al. |
| 2013/0346482 | A1 | 12/2013 | Holmes |
| 2014/0240524 | A1 | 8/2014 | Julia et al. |
| 2014/0241229 | A1* | 8/2014 | Bertorelle ............... H04W 4/06 370/312 |
| 2014/0298420 | A1 | 10/2014 | Barton et al. |
| 2015/0067769 | A1 | 3/2015 | Barton et al. |
| 2015/0163292 | A1 | 6/2015 | Lemire et al. |
| 2015/0319252 | A1 | 11/2015 | Momchilov et al. |
| 2016/0054897 | A1 | 2/2016 | Holmes et al. |
| 2016/0226871 | A1 | 8/2016 | Stephure et al. |
| 2016/0226979 | A1 | 8/2016 | Lancaster et al. |

FOREIGN PATENT DOCUMENTS

| | | |
|---|---|---|
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 4405812 | 1/2010 |
| JP | 2010-256972 | 11/2010 |
| RU | 2295752 | 3/2007 |
| RU | 2298287 | 4/2007 |
| RU | 2305860 | 9/2007 |
| WO | 98/58478 | 12/1998 |
| WO | 01/16724 | 3/2001 |
| WO | 02/09106 | 1/2002 |
| WO | 03/032569 | 4/2003 |
| WO | 03/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 2/2013 |
| WO | 2013/024343 | 2/2013 |
| WO | 2013/109984 | 7/2013 |
| WO | 2013/128284 | 9/2013 |
| WO | 2013/153439 | 10/2013 |

OTHER PUBLICATIONS

International Search Report and Written Opinion, dated Jun. 30, 2016, received in connection International Patent Application No. PCT/IB2016/000277.

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, $5^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), RemoteApp, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

Extended European Search Report, dated Mar. 3, 2015, received in connection with related European Application No. 09828497.9.

Extended European Search Report, dated Jun. 2, 2014, received in connection with European Application No. 12760310.8.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

International Search Report, dated Dec. 28, 2012, in connection with International Application No. PCT/IB2012/001590.

International Preliminary Report on Patentability and Written Opinion, dated Feb. 18, 2014, in connection with International Application No. PCT/IB2012/001590.

International Search Report and Written Opinion, dated Aug. 21, 2013, in connection with International Application No. PCT/IB2013/000676.

International Search Report and Written Opinion, dated Jul. 31, 2013, in connection with International Application No. PCT/IB2013/000720.

International Search Report and Written Opinion, dated Mar. 19, 2015, in connection with International Application No. PCT/US2014/064243.

* cited by examiner

METHOD FOR PROVIDING A CONNECTION OF A CLIENT TO AN UNMANAGED SERVICE IN A CLIENT-SERVER REMOTE ACCESS SYSTEM

CROSS-REFERENCE TO RELATED APPLICATIONS

This application claims priority to U.S. Provisional Patent Application No. 61/910,189, filed Nov. 29, 2013, entitled "METHOD FOR SERVER-SERVICE SEPARATION WITH END-TO-END FLOW CONTROL IN A CLIENT-SERVER REMOTE ACCESS ENVIRONMENT," and U.S. Provisional Patent Application No. 61/944,720, filed Feb. 26, 2014, entitled " METHOD FOR PROVIDING A CONNECTION OF A CLIENT TO AN UNMANAGED SERVICE IN A CLIENT-SERVER REMOTE ACCESS SYSTEM." The disclosures of the above are incorporated herein by reference in their entireties.

BACKGROUND

Ubiquitous remote access to services has become commonplace as a result of the growth and availability of broadband and wireless network access. As such, users are accessing services using an ever-growing variety of client devices (e.g., mobile devices, tablet computing devices, laptop/notebook/desktop computers, etc.). A remote server may communicate messages that contain data or other information between services and client devices over a variety of networks including, 3G and 4G mobile data networks, wireless networks such as WiFi and WiMax, wired networks, etc.

The services may be deployed on the same system node or computing device as an integrated remote access and application server, which also hosts a server remote access program to which client devices communicate. In other instances, services may be deployed on servers provided at different system nodes from the remote access server executing the server remote access program. While such environments provide deployment of large numbers of services, as well as a lighter weight installation and configuration process, there are problems associated with maintaining an operational statuses of such services at the remote access server.

SUMMARY

Disclosed herein are systems and methods for providing unmanaged services with a keep-alive mechanism to determine if the unmanaged service is operational. In accordance with an aspect of the disclosure, there is provided a method for providing connection of a client to an unmanaged service in a client-server remote access system. The method may include registering the unmanaged service at a remote access server and creating a communication connection there between, the remote access server being configured for providing remote access to the unmanaged service by a client; receiving keep-alive messages at the remote access server from the unmanaged service over the communication connection; receiving a request at the remote access server for a client connection to the unmanaged service; and communicating a terminate keep-alive message from the remote access server to the unmanaged service to terminate the sending of keep-alive messages from the unmanaged service in response to the request for the client connection to the unmanaged service.

In accordance with other aspects of the disclosure, another method for providing a connection of a client to an unmanaged service in a client-server remote access system is disclosed. The method may include executing the unmanaged service at a first application server; opening a communication connection between the unmanaged service and a remote access server; providing information to a remote access server to register the unmanaged service at the remote access server, the remote access server being configured for providing remote access to the unmanaged service by a client; communicating keep-alive messages from the unmanaged service to the remote access server over the communication connection; and terminating the keep-alive messages from the unmanaged service in response to receiving an instruction.

In accordance with yet other aspects of the disclosure, an apparatus for providing a connection of a client to an unmanaged service in a client-server remote access system is disclosed. The apparatus may include a remote access server having a server layer that is a communications proxy for messages sent between the client and the unmanaged service, and an application server executing a service layer associated with the unmanaged service. The remote access server receives keep-alive messages from the unmanaged service over a communication connection, wherein the remote access server receives a request for a client connection to the unmanaged service. The remote access server may also communicate a terminate keep-alive message to the unmanaged service to terminate the sending of keep-alive messages from the unmanaged service in response to the request for the client connection to the unmanaged service.

In accordance with other aspects, there is provided a method for providing a connection of a client to an unmanaged service in a client-server remote access system. The method may include executing the unmanaged service at a first application server; opening a communication connection between the unmanaged service and a remote access server; providing initial headers information to a remote access server to register the unmanaged service at the remote access server, the remote access server being configured for providing remote access to the first unmanaged service by a client; communicating keep-alive messages from the unmanaged service to the remote access server over the communication connection ; and terminating the keep-alive messages from the unmanaged service in response to a receiving an instruction request for a client connection at the remote access server.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing services, it will become evident to those skilled in the art that the implementations are not limited thereto, but are applicable for remotely accessing any type of data or service via a remote device.

Figure 1A:
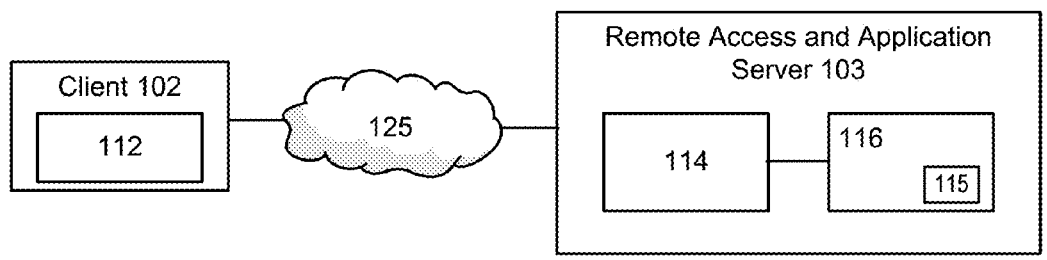
FIGS. 1A and 1B, illustrate example server-service models for client remote access to services in a layered architecture.
Figure 1B:
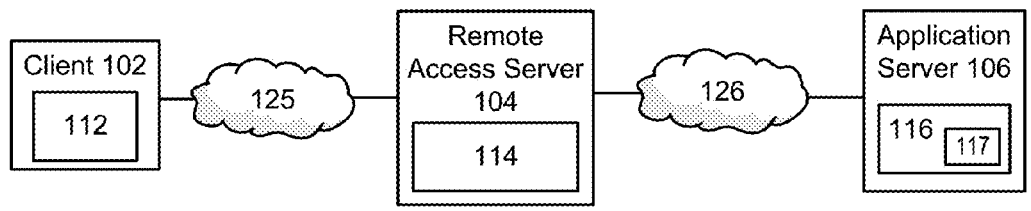

With the above overview as an introduction, reference is now made to FIGS. 1A and 1B, which illustrate examples of managed and unmanaged server-service models for client remote access to services in a layered architecture. As shown in FIG. 1A (managed service model), a client 102 having a client layer 112 may communicate to a remote access and application server 103 that includes a server layer 114 and a service layer 116. As such, the server layer 114 and service layer 116 execute on the same system node. The client layer 112 may include a client application, e.g., a web browser, dedicated application, etc., used to provide a user interface at the client 102 that displays information from a connected service or services. The client application may connect to a service using an application ID or application name. The client 102 may be wireless handheld devices such as, for example, an IPHONE, an ANDROID-based device, a tablet device or a desktop/notebook personal computer that are connected by a communication network 125 to the remote access and application server 103.

Figure 5:
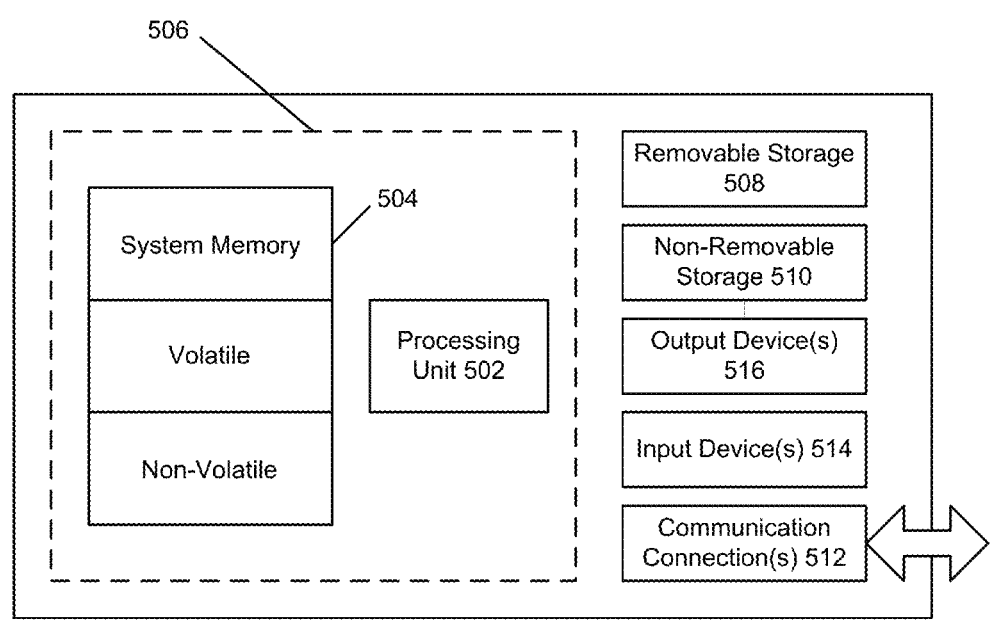
FIG. 5 illustrates an exemplary computing device.

The remote access and application server 103 may include a server remote access program that executes in the server layer 114. The server remote access program is used to connect the client 102 to a managed service 115 (e.g., an application) executing in the service layer 116. By "managed service," it is meant that remote access and application server 103 controls the application/process life cycle by starting and stopping the managed service 115 as clients connect and disconnect. For example, the managed service 115 may be a medical imaging application. Within the remote access and application server 103, the server remote access program in the server layer 114 may be connected to the service in the service layer 116 using a TCP socket connection and by, e.g., a system bus of the remote access and application server 103. Thus, bandwidth between the server remote access program and the service is extremely high. To provide additional services or application in the environment of FIG. 1A, additional service layers 116 are deployed on the remote access and application server 103. Alternatively, additional remote access and application servers 103 having additional server layers 114 and service layers 116 may be added. An example of the client 102 and the remote access and application server 103 is shown in FIG. 5.

Referring now to FIG. 1B (unmanaged service model), there is illustrated an example of a service-server model in which a remote access server 104 includes the server layer 114 in which the server remote access program executes. An application server 106 includes the service layer 116 in which the service or application executes. In the environment of FIG. 1B, the service (shown as unmanaged service 117) is provided on a system node or computing device that is a different system node or a computing device on which the server remote access program executes. The unmanaged service 117 communicates over a communication connection 126 to the remote access server 104. Thus, the service is on a node separate from the server. As used herein, an "unmanaged service" is an application that may reside on a same or different node (e.g., server) than the remote access server 104, but whose application/process life cycle is not managed by the remote access server 104. Rather, an external entity (the end user, or another process or application) launches the service outside of the remote access server.

The communication connection 126 may be a TCP/IP communications network, a VPN connection, a dedicated connection, etc. Such environments provide for deployment of large numbers of services, as service deployment is not limited by the capabilities of the remote access and application server 103 of FIG. 1A. As such, services can be created and destroyed in accordance with needs, therefore providing scalability. An example of the remote access server 104 and the application server 106 is shown in FIG. 5.

In FIG. 1B, the client 102 connects to the remote access server 104 over communication connection 125. The application server 106 may connect to the remote access server 104 at a predetermined Internet Protocol (IP) address and/or socket, or using a Uniform Resource Locator (URL) associated with the remote access server 104 to register the service or application with the server remote access program executing on the remote access server 104. The service, on startup, connects to the server using a server-service socket connection (described in more detail below) and establishes the session as a queued and unmanaged application to which a client may connect.

In the environment of FIG. 1B, the unmanaged service 117 may register with the remote access server 104 prior to a client 102 connected to the unmanaged service 117. Initially, a remotely accessible application (i.e., the unmanaged service 117) is launched at the application server 106. Herein, "remotely accessible" may be defined as an application that has been designed to run with a remote access toolkit provided as part of a Software Development Kit (SDK) implemented in the service layer 116. The unmanaged service 117 then connects to the remote access server 104 and registers therewith to create a communication there between. The remotely accessible application is now a "queued service," as it is ready to be connected to by one or more clients 102. The queued service is known by a unique application name (for a single type of remotely accessible application) and/or a unique application instanceId that is unique to the queued service connection.

The client 102 may connect to the unmanaged service 117 by connecting to the remote access server 104, as described above. In connecting to the remote access server 104, the client 102 may either connect to a specific instance of the queued service by using the application instanceId or connect to the first available queued service of a particular type using the application name. The remote access server 104 then facilitates the mechanics of connecting the client 102 to the queued service. Once the client is connected, the queued service is upgraded it to an "active service." Additional clients may connect to the active services by using the unique application instanceId whereby the connected clients may collaborate together with the active service. Additional services may be provided by adding additional application servers 106 that each communicate to the remote access server 104 over respective communication connections 126. For example, a second (or more) application server 106 may be added to host a second (or more) unmanaged service 117.

In both FIGS. 1A and 1B, the server remote access program may provide for connection marshalling and application process management. An example of the server remote access program is PUREWEB, available from Calgary Scientific, Inc. of Calgary, Alberta, Canada.

In accordance with aspects of the present disclosure, when an unmanaged service deployment is implemented as shown in FIG. 1B, there may be a need for the remote access server 104 to know if the unmanaged service 117 is disconnected or hung-up during a client connection process. Accordingly, a keep-alive mechanism may be provided whereby the unmanaged service 117 sends keep-alive messages to the remote access server 104 during the time when the unmanaged service 117 is first queued and before a client 102 connects.

Figure 2:
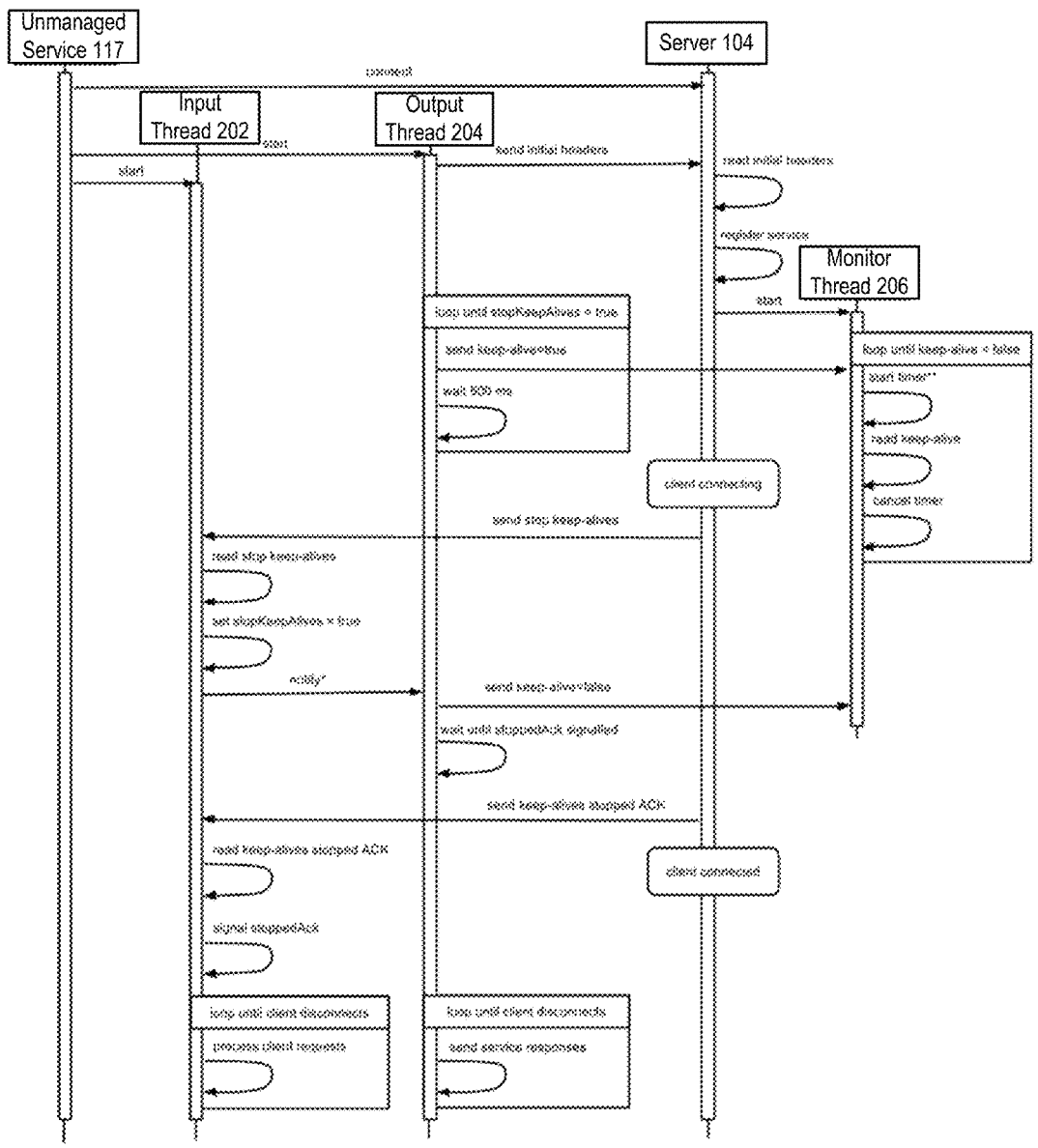
FIG. 2 illustrates a call flow diagram illustrating a sequence of messages that are sent between threads running in the unmanaged service and the remote access server to implement the keep-alive messaging of the present disclosure.

With reference to FIG. 2, there is illustrated a call flow diagram illustrating a sequence of messages that are sent between threads running in the unmanaged service 117 and the remote access server 104 to implement the keep-alive mechanism of the present disclosure. The remote access server 104 starts a monitor thread 206 to monitor the keep-alive messages from the unmanaged service 117 to detect if the unmanaged service 117 has gone away by determining that a keep-alive message has not been received within a configurable time interval or if the server-service socket connection between the remote access server 104 and the unmanaged service 117 has unexpectedly closed. If the server-service socket connection is lost, the client 102 disconnects its server session, which in turn, causes the remote access server 104 to close the server-service socket and purge the unmanaged service 117 from the system.

However, the keep-alive messaging may cause problems if the client 102 connects to the unmanaged service 117 while the keep-alive messaging is being performed, as there will be two threads writing simultaneously to the server-service socket. In particular, once the client 102 is connected, the remote access server 104 starts a thread to read service responses from the server-service socket to send back to the client 102. Before this thread is started, the remote access server 104 needs to ensure the monitor thread 206 is shutdown so there is only one thread reading from the server-service socket at a time. Otherwise the monitor thread runs the risk of consuming a response intended for the client 120 which may break the client-service request/response protocol. The remote access server 104 also needs to ensure that the unmanaged service 117 has stopped sending keep-alive messages, which might otherwise be communicated to the client 112. Here, the client 102 would not know what to do with the keep-alive message.

Thus, in accordance with the present disclosure, the keep-alive messaging is shut down just before the client 102 connects to the unmanaged service 117. A handshake process may be implemented that takes place between the remote access server 104 and the unmanaged service 117 to shutdown the keep-alive messages in an orderly fashion when the client 102 is connecting, such that normal processing can proceed, i.e., the service input/output threads transition from sending keep-alive messages to receiving client input and sending service responses. In this manner, there is a handoff of one thread to another in the socket.

Figure 3:
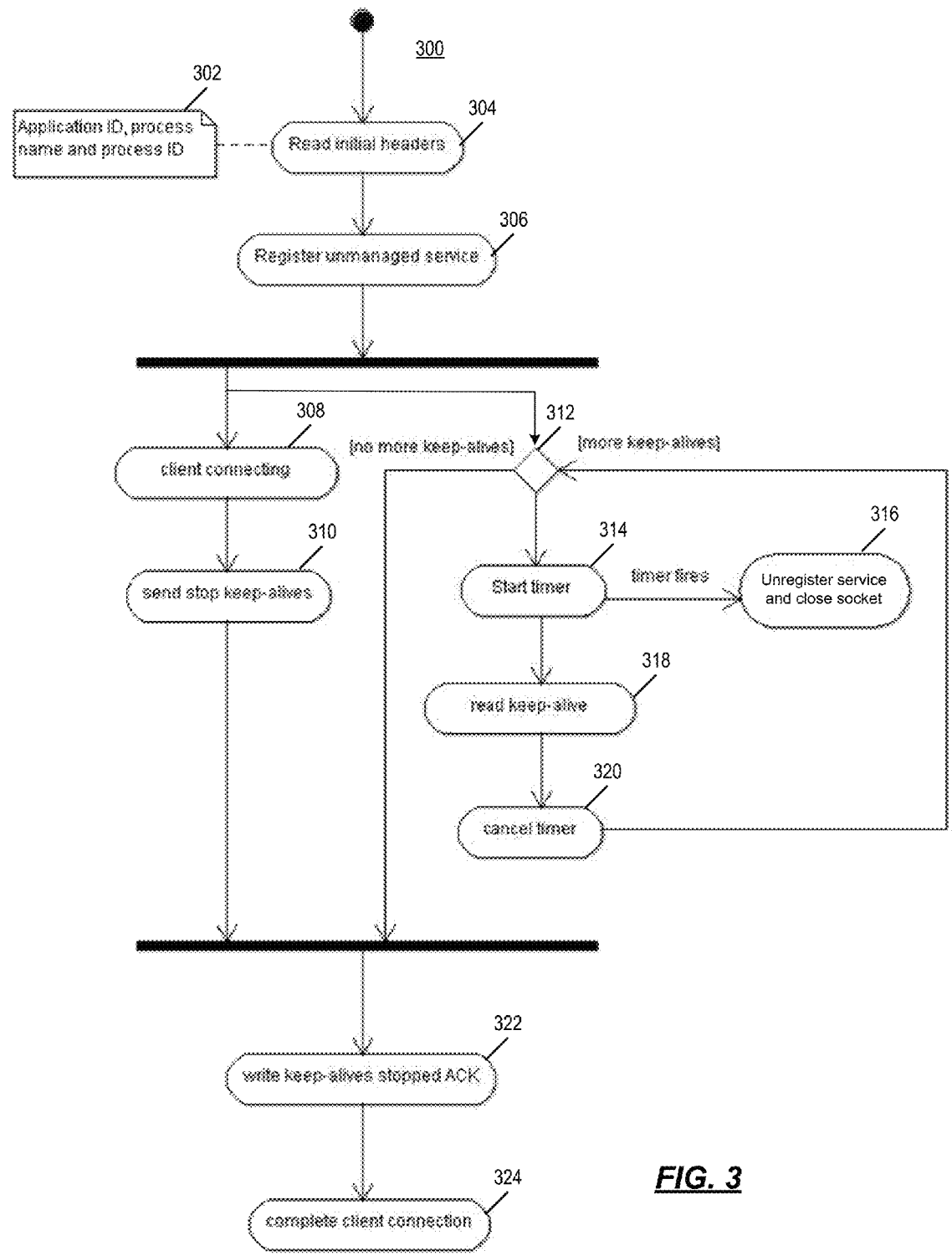
FIG. 3 illustrates operational flow diagrams of processes performed by an unmanaged service to implement the keep-alive messaging shown in FIG. 2.
Figure 4:
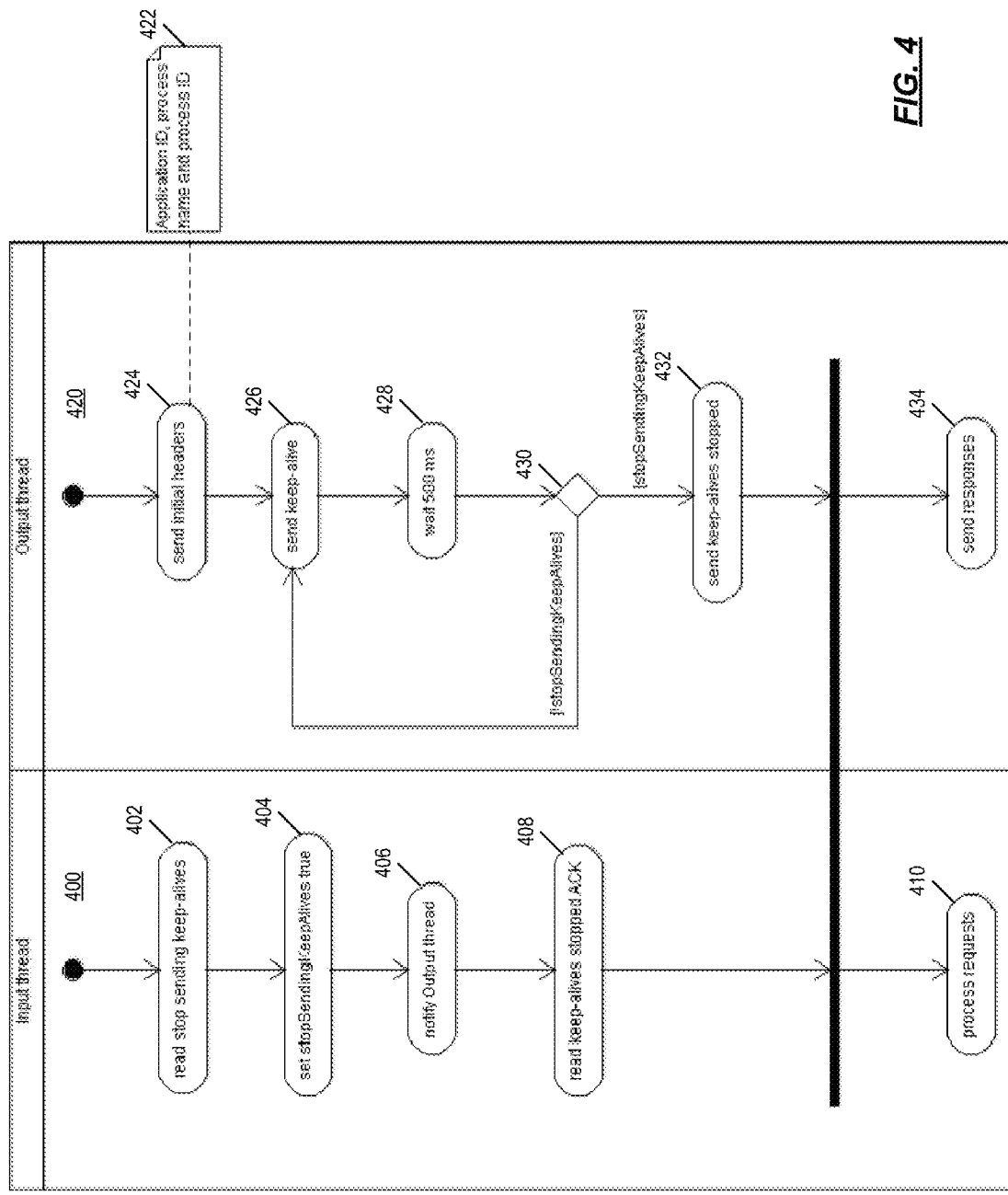
FIG. 4 illustrates an operational flow diagram of processes performed by a remote access server to implement the keep-alive messaging shown in FIG. 2.

FIG. 2 illustrates a call flow diagram illustrating a sequence of messages that are sent between threads running in the unmanaged service and the remote access server to implement the keep-alive messaging of the present disclosure. FIG. 3 illustrates an operational flow diagram 300 of processes performed by the remote access server 104 to implement the keep-alive messaging shown in FIG. 2. FIG. 4 illustrates operational flow diagrams 400 and 420 of processes performed by the unmanaged service 117 to implement the keep-alive messaging shown in FIG. 2. The operational flows 300, 400 and 420 may be executed simultaneously by the remote access server 104 and unmanaged service 117 to implement keep-alive messaging as introduced above.

As shown in FIG. 2 and FIG. 4, when the unmanaged service 117 connects to the remote access server 104, an input thread 202 and an output thread 204 are started, which execute the operational flows 400 and 420, respectively. At 422, an application ID, process name and process ID (i.e., information associated with the unmanaged service 117) is sent as initial headers to the remote access server 104 (at 424). As shown in FIG. 3, this information (from 422) is received by the remote access server 104 at 304. At 306, the remote access server 104 registers the unmanaged service 117. Next, the monitor thread 206 is started and begins its operational flow, as shown in 300.

The output thread 204 begins a loop at 426 where keep-alive messages are sent, the output thread 204 waits a configurable amount of time (e.g., 500 ms at 428) and determines if a stop sending keep-alives has been received (at 430, from the remote access server 104, described below). If the stop sending keep-alives has not been received, the loop returns to 426. If a stop sending keep-alives has been received, then the sending of keep-alive messages is stopped by the output thread 204 at 432. It is noted that the wait time at 428 is configurable and may be a time period other than 500 ms.

Concurrently with the above, the monitor thread 206 operates in a loop at 312 to start a timer at 314, read the keep-alive message from the output thread 204 (at 318) and cancel the timer at 320. This loop is performed during the period of time when the unmanaged service 117 is connected to the remote access server 104, but before a client connection is received. If the timer started at 314 expires before a keep-alive message is received, then at 316, the socket associated with the unmanaged service 117 is closed and the service is unregistered, as it is assumed the unmanaged service 117 has gone away.

Concurrent with the operation of the loop at 312, at 308, it may be determined by the remote access server 104 that a client is connecting to the remote access server 104 to remotely access the unmanaged service 117 (e.g., a connection from the client 102 at the URL of the remote access server 104). The determination at 308 may be determined at any time after the unmanaged service 117 connects to the remote access server 104 as shown in FIG. 2. At 310, the remote access server 104 sends a message to the input thread 202 to stop sending keep-alive messages. This message is received by the input thread at 402, which sets a stopSendingKeepAlives value to "true" at 404. At 406, the input thread 202 notifies the output thread 204 that it should stop sending keep-alive messages.

The output thread 204, at 430, determines if a notification from the input thread 202 indicates to stop sending keep-alive messages. The output thread 204, upon receipt of the notification to stop sending keep-alive messages, stops at 432 and sends a "keep-alive=false" to the monitor thread 206. The output thread waits and then loops to process client requests (at 434) until the client disconnects. The remote access server 104 stops the monitor thread and sends an acknowledgement to the input thread 202 at 322, which is received at 408. The remote access server 104 completes the connection to the client 102 at 324. The input thread 202 loops to process client request (at 410) until the client disconnects.

Thus, the above is an example mechanism by which keep-alive messages may be communicated to a socket to determine that the unmanaged service 117 is responsive that also enables a client to connect to the same socket without creating confusion between the keep-alive messaging and the client connection process.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of tangible computer readable media. Computer readable media can be any available tangible media that can be accessed by device 500 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing connection of a client to an unmanaged service in a client-server remote access system, comprising:
　　registering the unmanaged service at a remote access server and creating a communication connection therebetween, the remote access server being configured for providing remote access to the unmanaged service by a client;

receiving keep-alive messages at the remote access server from the unmanaged service over the communication connection;

receiving a request at the remote access server for a client connection to the unmanaged service; and communicating a terminate keep-alive message from the remote access server to the unmanaged service to terminate the sending of keep-alive messages from the unmanaged service in response to the request for the client connection to the unmanaged service.

2. The method of claim 1, further comprising executing at the remote access server a monitor thread to receive the keep-alive messages and monitor for the request for the client connection.

3. The method of claim 2, further comprising:
determining if the keep-alive messages are being sent by the unmanaged service;
starting a timer for a predetermined period of time;
determining if a keep-alive message has been received within the predetermined period of time; and
if the keep-alive message was not received, unregistering the unmanaged service; and
if the keep-alive message was received, canceling the timer and looping back to the determining step.

4. The method of claim 3, further comprising closing the communication connection.

5. The method of claim 2, further comprising communicating from the remote access server an acknowledgement to the unmanaged service that the monitor thread has stopped.

6. The method of claim 1, wherein the unmanaged service executes on a computing device other than the remote access server.

7. The method of claim 1, wherein the unmanaged service executes on the remote access server.

8. A method for providing a connection of a client to an unmanaged service in a client-server remote access system, comprising:
executing the unmanaged service at a first application server;
opening a communication connection between the unmanaged service and a remote access server;
providing information to a remote access server to register the unmanaged service at the remote access server, the remote access server being configured for providing remote access to the unmanaged service by a client;
communicating keep-alive messages from the unmanaged service to the remote access server over the communication connection; and
terminating the keep-alive messages from the unmanaged service in response to receiving an instruction.

9. The method of claim 8, further comprising communicating the keep-alive messages from the unmanaged service to the remote access at a predetermined time interval.

10. The method of claim 8, further comprising executing an output thread and an input thread at the unmanaged service, wherein the output thread sends the keep-alive messages to the remote access server, and wherein the input thread receives an instruction to stop sending the keep-alive messages.

11. The method of claim 10, further comprising servicing the client connection after terminating the keep-alive messages, the servicing being performed by the input thread and the output thread.

12. The method of claim 8, wherein the first application server and the remote access server are the same computing device.

13. The method of claim 8, wherein the first application server is a computing device other than a computing device associated with the remote access server.

14. The method of claim 8, wherein the instruction is received from a remote access server.

15. The method of claim 14, wherein the instruction is received in response to a request for a client connection at the remote access server.

16. The method of claim 8, further comprising:
executing at least a second unmanaged service at at least a second application server;
creating a second communication connection between the at least second unmanaged service and the remote access server;
providing information to a remote access server to register the at least second unmanaged service at the remote access server, the remote access server being configured for providing remote access to the at least second unmanaged service by a client;
communicating keep-alive messages from the at least second unmanaged service to the remote access server over the second communication connection; and
terminating the keep-alive messages from the at least second unmanaged service in response to receiving an instruction.

17. An apparatus for providing a connection of a client to an unmanaged service in a client-server remote access system, further comprising:
a remote access server having a server layer that is a communications proxy for messages sent between the client and the unmanaged service;
an application server executing a service layer associated with the unmanaged service,
wherein the remote access server receives keep-alive messages from the unmanaged service over a communication connection, wherein the remote access server receives a request for a client connection to the unmanaged service, and wherein the remote access server communicates a terminate keep-alive message to the unmanaged service to terminate the sending of keep-alive messages from the unmanaged service in response to the request for the client connection to the unmanaged service.

18. The apparatus of claim 17, wherein the remote access server executes a monitor thread to receive the keep-alive messages and monitor for the request for the client connection.

19. The apparatus of claim 18, wherein the remote access server determines if the keep-alive messages are being sent by the unmanaged service by starting a timer for a predetermined period of time, and wherein if the keep-alive message was not received within the predetermined period of time, the remote access server unregisters the unmanaged service.

20. The apparatus of claim 17, wherein the remote access server and the application server maintain message queues associated with the unmanaged service to communicate messages once the client connection is established.

* * * * *

UNITED STATES PATENT AND TRADEMARK OFFICE
CERTIFICATE OF CORRECTION

PATENT NO. : 9,686,205 B2
APPLICATION NO. : 14/534274
DATED : June 20, 2017
INVENTOR(S) : Sam Anthony Leitch et al.

Page 1 of 1

It is certified that error appears in the above-identified patent and that said Letters Patent is hereby corrected as shown below:

In the Claims

In Claim 17, at Column 10, Line 31, delete the word "further".

Signed and Sealed this
First Day of October, 2019

Andrei Iancu
*Director of the United States Patent and Trademark Office*